(12) United States Patent
Adamshick

(10) Patent No.: US 6,415,830 B1
(45) Date of Patent: Jul. 9, 2002

(54) MATERIAL SUPPORT TOOL USED FOR ROUTERS

(76) Inventor: Peter Adamshick, 5 Blazure Dr., Bernardsville, NJ (US) 07924

( * ) Notice: Subject to any disclaimer, the term of this patent is extended or adjusted under 35 U.S.C. 154(b) by 0 days.

(21) Appl. No.: 09/833,425

(22) Filed: Apr. 12, 2001

(51) Int. Cl.[7] .............................. B27C 5/00; B27C 1/12
(52) U.S. Cl. ................... 144/135.2; 144/136.1; 144/137; 144/242.1; 144/245.1; 144/371; 269/58; 269/60; 269/246; 409/163; 409/225; 409/229; 409/334
(58) Field of Search .................... 144/134.1, 135.2, 144/137, 136.1, 371, 242.1, 245.1; 269/56, 58, 60, 87, 224, 246; 409/181, 163, 219, 225, 226, 229, 344

(56) References Cited

U.S. PATENT DOCUMENTS

| | | | |
|---|---|---|---|
| 1,801,722 A | 4/1931 | Clausing | |
| 2,668,568 A | * 2/1954 | Budd | 144/135.2 |
| 3,782,431 A | 1/1974 | Cox | |
| 4,927,126 A | * 5/1990 | Hoffman | 269/60 |
| 5,052,454 A | 10/1991 | Meinhardt | |
| 5,161,589 A | 11/1992 | Debiagio | |
| D351,775 S | 10/1994 | Wedler | |
| 5,893,402 A | 4/1999 | Darling | |

* cited by examiner

Primary Examiner—W. Donald Bray

(57) ABSTRACT

A material support tool used for routers for allowing pieces of wood to be cut accurately and safely. The material support tool used for routers includes a base member having a hole centrally disposed therethrough and being adapted to receive a router bit therethrough; and also includes a first material support assembly being mounted upon a top of the base member; and further includes a second material support assembly also being mounted upon the top of the base member and being spaced from the first material support assembly, and in combination with the first material support assembly being adapted to support a piece of wood therebetween.

11 Claims, 2 Drawing Sheets

MATERIAL SUPPORT TOOL USED FOR ROUTERS

BACKGROUND OF THE INVENTION

1. Field of the Invention

The present invention relates to a routing wood support tool and more particularly pertains to a new material support tool used for routers for allowing pieces of wood to be cut accurately and safely.

2. Description of the Prior Art

The use of a routing wood support tool is known in the prior art. More specifically, a routing wood support tool heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,161,589; U.S. Pat. No. 1,801,722; U.S. Pat. No. 5,893,402; U.S. Pat. No. 5,052,454; U.S. Pat. No. 3,782,431; and U.S. Pat. No. Des. 351,775.

While these devices fulfill their respective, particular objectives and requirements, the aforementioned patents do not disclose a new material support tool used for routers. The inventive device includes a base member having a hole centrally disposed therethrough and being adapted to receive a router bit therethrough; and also includes a first material support assembly being mounted upon a top of the base member; and further includes a second material support assembly also being mounted upon the top of the base member and being spaced from the first material support assembly, and in combination with the first material support assembly being adapted to support a piece of wood therebetween.

In these respects, the material support tool used for routers according to the present invention substantially departs from the conventional concepts and designs of the prior art, and in so doing provides an apparatus primarily developed for the purpose of allowing pieces of wood to be cut accurately and safely.

SUMMARY OF THE INVENTION

In view of the foregoing disadvantages inherent in the known types of routing wood support tool now present in the prior art, the present invention provides a new material support tool used for routers construction wherein the same can be utilized for allowing pieces of wood to be cut accurately and safely.

The general purpose of the present invention, which will be described subsequently in greater detail, is to provide a new material support tool used for routers which has many of the advantages of the routing wood support tool mentioned heretofore and many novel features that result in a new material support tool used for routers which is not anticipated, rendered obvious, suggested, or even implied by any of the prior art routing wood support tool, either alone or in any combination thereof.

To attain this, the present invention generally comprises a base member having a hole centrally disposed therethrough and being adapted to receive a router bit therethrough; and also includes a first material support assembly being mounted upon a top of the base member; and further includes a second material support assembly also being mounted upon the top of the base member and being spaced from the first material support assembly, and in combination with the first material support assembly being adapted to support a piece of wood therebetween.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new material support tool used for routers which has many of the advantages of the routing wood support tool mentioned heretofore and many novel features that result in a new material support tool used for routers which is not anticipated, rendered obvious, suggested, or even implied by any of the prior art routing wood support tool, either alone or in any combination thereof.

It is another object of the present invention to provide a new material support tool used for routers which may be easily and efficiently manufactured and marketed.

It is a further object of the present invention to provide a new material support tool used for routers which is of a durable and reliable construction.

An even further object of the present invention is to provide a new material support tool used for routers which is susceptible of a low cost of manufacture with regard to both materials and labor, and which accordingly is then susceptible of low prices of sale to the consuming public, thereby making such material support tool used for routers economically available to the buying public.

Still yet another object of the present invention is to provide a new material support tool used for routers which provides in the apparatuses and methods of the prior art some of the advantages thereof, while simultaneously overcoming some of the disadvantages normally associated therewith.

Still another object of the present invention is to provide a new material support tool used for routers for allowing pieces of wood to be cut accurately and safely.

Yet another object of the present invention is to provide a new material support tool used for routers which includes a base member having a hole centrally disposed therethrough and being adapted to receive a router bit therethrough; and also includes a first material support assembly being mounted upon a top of the base member; and further includes a second material support assembly also being mounted upon the top of the base member and being spaced from the first material support assembly, and in combination with the first material support assembly being adapted to support a piece of wood therebetween.

Still yet another object of the present invention is to provide a new material support tool used for routers that is easy and convenient to use.

Even still another object of the present invention is to provide a new material support tool used for routers that allows users to precisely cut pieces of wood and plastic.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
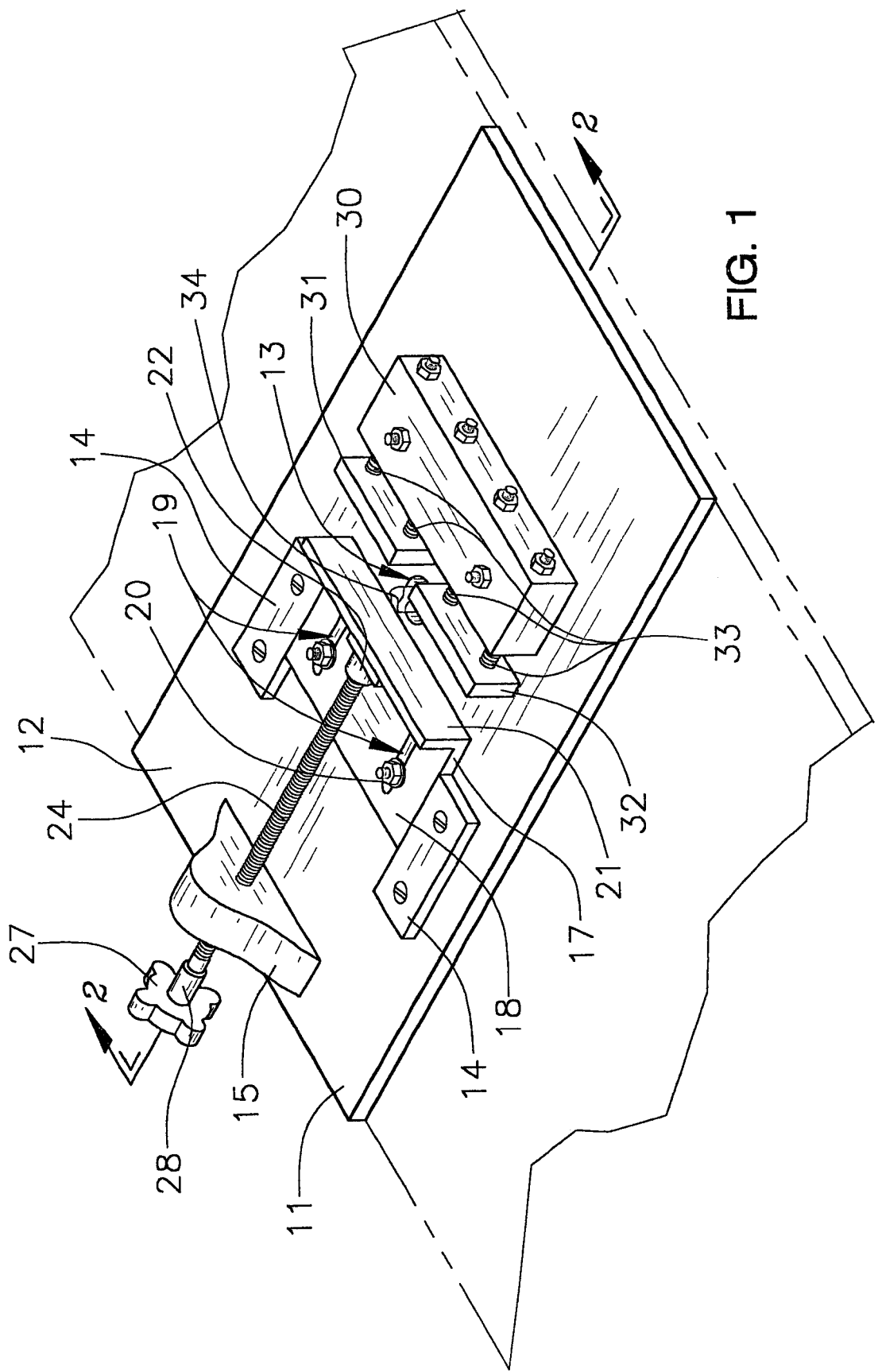
FIG. 1 is a perspective view of a new material support tool used for routers according to the present invention.
Figure 2:
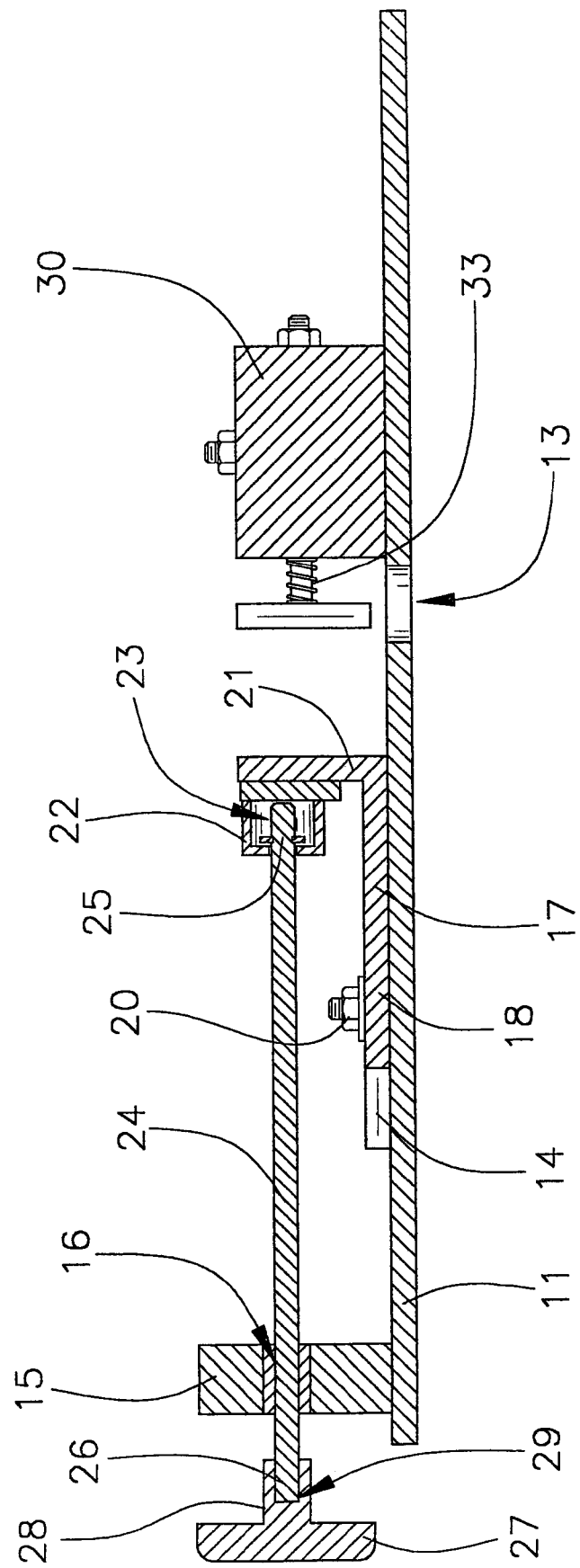
FIG. 2 is a cross-sectional view of the present invention.

With reference now to the drawings, and in particular to FIGS. 1 through 2 thereof, a new material support tool used for routers embodying the principles and concepts of the present invention and generally designated by the reference numeral 10 will be described.

As best illustrated in FIGS. 1 through 2, the material support tool used for routers 10 generally comprises a base member 11 having a hole 13 centrally disposed therethrough and being adapted to receive a router bit 34 therethrough with the base member 11 being a board-shaped member.

A first material support assembly is conventionally mounted upon a top 12 of the base member 11. The first material support assembly includes a pair of guide members 14 being spaced apart and being securely fastened to the top 12 of the base member 11, and also includes a shaft support member 15 being securely and conventionally attached to the top 12 and near an edge of the base member 11, and further includes a first material support member 17 being movably disposed upon the base member 11 and being disposed between the guide members 14, and also includes a shaft 24 being threaded through the shaft support member 15 and having a first end 25 which is attached to the first material support member 17, and further includes a handle member 27 being conventionally attached to a second end 26 of the shaft 25. The guide members 14 are plates. The shaft support member 15 is a body having a contoured and curved top surface and also having front and back sides and further having a bore 16 extending therethrough from the front side to the back side. The first material support member 17 includes a plate-like main portion 18 which is movably disposed upon the base member 11 between the guide members 14 and which has elongate slots 19 disposed therethrough, and also includes an end portion 21 which is angled relative to the plate-like main portion 18 and which extends outwardly from the base member 11 and which is adapted to engage a piece of wood, and further includes a boss 22 being conventionally disposed upon the end portion 21 and having a bore 23 therein. The elongate slots 19 are adapted to receive fastening members 20 therethrough for fastening the first material support member 17 upon the base member 11. The first end 25 of the shaft 24 is securely and conventionally disposed in the bore 23 of the boss 22. The handle member 27 is a knob having a boss member 28 which has a bore 29 therein. The bore 29 of the boss member 28 is adapted to receive the second end 26 of the shaft 24.

A second material support assembly is also mounted upon the top 12 of the base member 11 and is spaced from the first material support assembly, and in combination with the first material support assembly is adapted to support a piece of material therebetween. The second material support assembly includes a support base 30 being securely and conventionally fastened upon the base member 11, and also includes a pair of second material support members 31,32 being movably disposed upon the base member 11 and being movably attached to the support base 30, and further includes spring members 33 being attached to the second material support members 31,32 and to the support base 30 and being disposed therebetween. The second material support members 31,32 are spaced apart to allow the router bit 34 to be received therebetween. The second material support members 31,32 are biasedly moved to receive the router bit 34 therebetween. The hole 13 of the base member 11 is disposed between the first and second material support members 17,31,32.

In use, the user places the base member 11 upon a router such that the router bit 34 is disposed through the hole 13 in the base member 11. The user then places a piece of material such as wood between the first and second material support members 17,31,32 and turns on the router bit 34. The user then turns the handle member 27 to move the first material support member 17 toward the second material support members 31,32 and toward the router bit 34; whereupon the piece of material is cut as desired by the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A material support tool used for routers comprising:
   a base member having a hole centrally disposed therethrough and being adapted to receive a router bit therethrough;
   a first material support assembly being mounted upon a top of said base member;
   a second material support assembly also being mounted upon said top of said base member and being spaced from said first material support assembly, and in combination with said first material support assembly being adapted to support a piece of wood therebetween; and
   wherein said first material support assembly includes a pair of guide members being spaced apart and being securely fastened to said top of said base member, and also includes a shaft support member being securely attached to said top and near an edge of said base member, and further includes a first material support member being movably disposed upon said base member and being disposed between said guide members, and also includes a shaft being threaded through said shaft support member and having a first end which is attached to said first material support member, and further includes a handle member being attached to a second end of said shaft.

2. A material support tool used for routers as described in claim 1, wherein said base member is a board-shaped member.

3. A material support tool used for routers as described in claim 1, wherein said guide members are plates.

4. A material support tool used for routers as described in claim 1, wherein said shaft support member is a body having a contoured and curved top surface and also having front and back sides and further having a bore extending therethrough from said front side to said back side.

5. A material support tool used for routers as described in claim 4, wherein said first material support member includes a plate-like main portion which is movably disposed upon said base member between said guide members and which has elongate slots disposed therethrough, and also includes an end portion which is angled relative to said plate-like main portion and which extends outwardly from said base member and which is adapted to engage a piece of wood, and further includes a boss being disposed upon said end portion and having a bore therein.

6. A material support tool used for routers as described in claim 5, wherein said elongate slots are adapted to receive fastening members therethrough for fastening said first material support member upon said base member.

7. A material support tool used for routers as described in claim 5, wherein said first end of said shaft is securely disposed in said bore of said boss.

8. A material support tool used for routers as described in claim 6, wherein said handle member is a knob having a boss member which has a bore therein, said bore of said boss member is adapted to receive said second end of said shaft.

9. A material support tool used for routers as described in claim 1, wherein said second material support assembly includes a support base being securely fastened upon said base member, and also includes a pair of second material support members being movably disposed upon said base member and being movably attached to said support base, and further includes spring members being attached to said second material support members and to said support base and being disposed therebetween.

10. A material support tool used for routers as described in claim 9, wherein said second material support members are spaced apart to allow the router bit to be received therebetween, said second material support members being biasedly moved to receive the router bit therebetween, said hole of said base member being disposed between said first and second material support members.

11. A material support tool used for routers comprising:
    a base member having a hole centrally disposed therethrough and being adapted to receive a router bit therethrough, said base member being a board-shaped member;
    a first material support assembly being mounted upon a top of said base member, said first material support assembly including a pair of guide members being spaced apart and being securely fastened to said top of said base member, and also including a shaft support member being securely attached to said top and near an edge of said base member, and further including a first material support member being movably disposed upon said base member and being disposed between said guide members, and also including a shaft being threaded through said shaft support member and having a first end which is attached to said first material support member; and further including a handle member being attached to a second end of said shaft, said guide members being plates, said shaft support member being a body having a contoured and curved top surface and also having front and back sides and further having a bore extending therethrough from said front side to said back side, said first material support member including a plate-like main portion which is movably disposed upon said base member between said guide members and which has elongate slots disposed therethrough, and also including an end portion which is angled relative to said plate-like main portion and which extends outwardly from said base member and which is adapted to engage a piece of wood, and further including a boss being disposed upon said end portion and having a bore therein, said elongate slots being adapted to receive fastening members therethrough for fastening said first material support member upon said base member, said first end of said shaft being securely disposed in said bore of said boss, said handle member being a knob having a boss member which has a bore therein, said bore of said boss member is adapted to receive said second end of said shaft; and
    a second material support assembly also being mounted upon said top of said base member and being spaced from said first material support assembly, and in combination with said first material support assembly being adapted to support a piece of wood therebetween, said second material support assembly including a support base being securely fastened upon said base member, and also including a pair of second material support members being movably disposed upon said base member and being movably attached to said support base, and further including spring members being attached to said second material support members and to said support base and being disposed therebetween, said second material support members being spaced apart to allow the router bit to be received therebetween, said second material support members being biasedly moved to receive the router bit therebetween, said hole of said base member being disposed between said first and second material support members.

* * * * *